United States Patent
Moon et al.

(10) Patent No.: US 7,012,664 B2
(45) Date of Patent: Mar. 14, 2006

(54) DISPLAY PANEL AND LIQUID CRYSTAL DISPLAY INCLUDING SIGNAL LINES

(75) Inventors: Sung Jae Moon, Seoul (KR); Dong-Gyu Kim, Yongin (KR); Sang-Soo Kim, Seoul (KR)

(73) Assignee: Samsung Electronics Co., Ltd., (KR)

( * ) Notice: Subject to any disclaimer, the term of this patent is extended or adjusted under 35 U.S.C. 154(b) by 157 days.

(21) Appl. No.: 10/714,727

(22) Filed: Nov. 17, 2003

(65) Prior Publication Data
US 2004/0125258 A1  Jul. 1, 2004

(30) Foreign Application Priority Data
Dec. 30, 2002  (KR) .................... 10-2002-0087435

(51) Int. Cl.
*G02F 1/1343* (2006.01)
(52) U.S. Cl. ..................... 349/139; 349/152
(58) Field of Classification Search ............... 349/139, 349/152
See application file for complete search history.

(56) References Cited

U.S. PATENT DOCUMENTS 5,621,554 A * 4/1997 Kuniyori .................... 349/139
5,835,177 A * 11/1998 Dohjo et al. ................ 349/147
6,760,091 B1 * 7/2004 Uehara ....................... 349/152

* cited by examiner

*Primary Examiner*—Toan Ton
*Assistant Examiner*—Ann Jones
(74) *Attorney, Agent, or Firm*—Cantor Colburn LLP

(57) ABSTRACT

A liquid crystal display includes a plurality of signal lines. The signal lines are parallel to each other in a display area, the distances between the signal lines vary such that the signal lines are arranged like a fan in a fan-out area, and the signal lines are connected to a driving circuit in a connection area. Each signal line includes a single-layered portion and a double-layered portion located in the fan-out area, and the length of the single-layered portion of relatively longer signal line is relatively shorter.

11 Claims, 5 Drawing Sheets

DISPLAY PANEL AND LIQUID CRYSTAL DISPLAY INCLUDING SIGNAL LINES

BACKGROUND OF THE INVENTION (a) Field of the Invention

The present invention relates to a display panel including a plurality of signal line, and particularly to a liquid crystal display including a plurality of lines having different length.

(b) Description of Related Art

A display device such as a liquid crystal display (LCD) or an organic electroluminescence (EL) display includes a plurality of pixels as basic elements for displaying an image. Each pixel includes a switching element for independent operation.

The switching elements include a tri-terminal element including a control terminal, an input terminal, and an output terminal, which is turned on or off in response to a signal applied to the control terminal and selectively transmits a signal entering into the input terminal via the output terminal. For this purpose, a plurality of signal lines for applying the signals to the control terminals and the input terminals of the switching elements and a plurality of driving circuits for supplying the signals to the signal lines are provided at a display device.

The TFT array panel includes a plurality of scanning signal lines or gate lines for transmitting scanning signals, a plurality of image signal lines or data lines for transmitting image signals, a plurality of TFTs connected to the gate lines and the data lines, a plurality of pixel electrodes connected to the TFTs, a gate insulating layer covering the gate lines for insulation, and a passivation layer covering the TFTs and the data lines for insulation.

The TFT includes a gate electrode, which is a part of the gate line, a semiconductor layer for a channel, source and drain electrode, which are parts of the data line, a gate insulating layer, and a passivation layer. The TFT is a switching element for transmitting or blocking the image signal from the data line to the pixel electrode in response to the scanning signal from the gate line.

The driving circuits are located near edges of the display device and connected to end portions of the signal lines, which are clustered in a small area (referred to as "connection area" hereinafter) for the connection. On the contrary, the distances between the signal lines in an area (referred to as "display area") including the pixels have a value determined by the size of the pixels to have larger values than the distances between their end portions connected to the driving circuits. Accordingly, a plurality of fan-out areas in which the distances between the signal lines gradually increase or decrease like a fan are provided between the connection area and the display area.

Although the signal lines near the center of the fan-out area extends straight without curving, the signal lines closer to edges of the fan-out area have larger curving angles. This configuration of the fan-out area results in the difference in the length between the signal lines such that the line length near the center of the fan-out area is shorter than the line length near the edges of the fan-out area. The length difference differentiates the resistances of the signal lines, which results in the deteriorated image quality.

In particular, since a liquid crystal display uses a voltage control scheme which controls voltages applied to the pixels, the voltage difference due to the resistance difference causes a severe problem in image quality.

SUMMARY OF THE INVENTION

A motivation of the present invention is to reduce resistance difference due to length difference of signal lines.

A display panel including a plurality of signal lines is provided. Each signal line includes a first portion and a second portion, and the display panel includes a first area including the first portions of the signal lines and a second area including the second portions of the signal lines. The first portions of the signal lines have substantially the same length and the second portions of the signal lines have different lengths. The second portion of each signal line includes a third portion and a fourth portion and the third and the fourth portion include at least one layer. The number of layers in the third portion is smaller than the number of layers in the fourth portion.

The length of the third portion of each signal line preferably depends on the entire length of the signal line. Preferably, the length of the third portion of relatively longer signal line is relatively shorter, and in particular, the length of the third portion of each signal line is inversely proportional to the entire length of the signal line.

It is preferable that each signal line further includes a fifth portion for connection with outside, and the display panel further includes a third area including the fifth portions of the signal lines and located opposite the first area with respect to the second area.

The signal lines may be arranged like a fan in the second area, and the length of the signal line closer to edges of the second area is longer.

The display panel may further include a driving circuit connected to the signal lines in the third area and supplying signals to the signal lines. The driving circuit is chip-mounted on the display panel or mounted on a separately provided printed circuit. The printed circuit includes a plurality of conductive lines for electrical connection between the driving circuit and an external device, and the conductive lines are connected to the signal lines in the third area.

Preferably, the third portion of each signal line has a single-layered structure while the fourth portion of each signal line has a double-layered structure.

A display panel including a plurality of signal lines is provided, the display panel includes: a first area where distances between the signal lines are substantially the same, and a second area where distances between the signal lines vary. Each signal line includes a first portion and a second portion, the first and the second portion of each signals line are located in the second area and include at least one layer, and the number of layers in the first portion is smaller than the number of layers in the second portion.

It is preferable that the lengths of the signal lines in the second area are different, the length of the first portion of relatively longer signal line is relatively shorter, and the signal lines are arranged like a fan in the second area.

Preferably, the display panel further includes a third area located opposite the first area with respect to the second area, and the distances between the signal lines in the third area are shorter than the distances between the signal lines in the first area.

The display panel may further include a driving circuit connected to the signal lines in the third area and supplying signals to the signal lines.

A liquid crystal display according to an embodiment of the present invention includes a display area, first and second fan-out areas, and first and second connection areas.

The liquid crystal display includes: an insulating substrate; a plurality of gate lines formed on the substrate, each gate line including a connecting portion; a plurality of data lines insulated from the gate lines and intersecting the gate lines in the display area, each data line including a connecting portion; a gate driving circuit connected to the connecting portions of the gate lines in the first connection areas; and a data driving circuit connected to the connecting portions of the data lines in the second connection areas. Each gate line or data line include a lower portion including at least one layer and located in the first or the second fan-out area, and the number of layers in the lower portion is smaller than the number of layers in other portions.

It is preferable that the length of the lower portion of relatively longer gate line or data line is relatively shorter, and the length of the lower portion closer to a center of the driving circuits is longer.

Preferably, the liquid crystal display further includes a plurality of thin film transistors connected to the gate lines and the data lines and a plurality of pixel electrodes connected to the thin film transistors.

BRIEF DESCRIPTION OF THE DRAWINGS

The above and other advantages of the present invention will become more apparent by describing preferred embodiments thereof in detail with reference to the accompanying drawings in which.

DETAILED DESCRIPTION OF PREFERRED EMBODIMENTS

Figure 1:
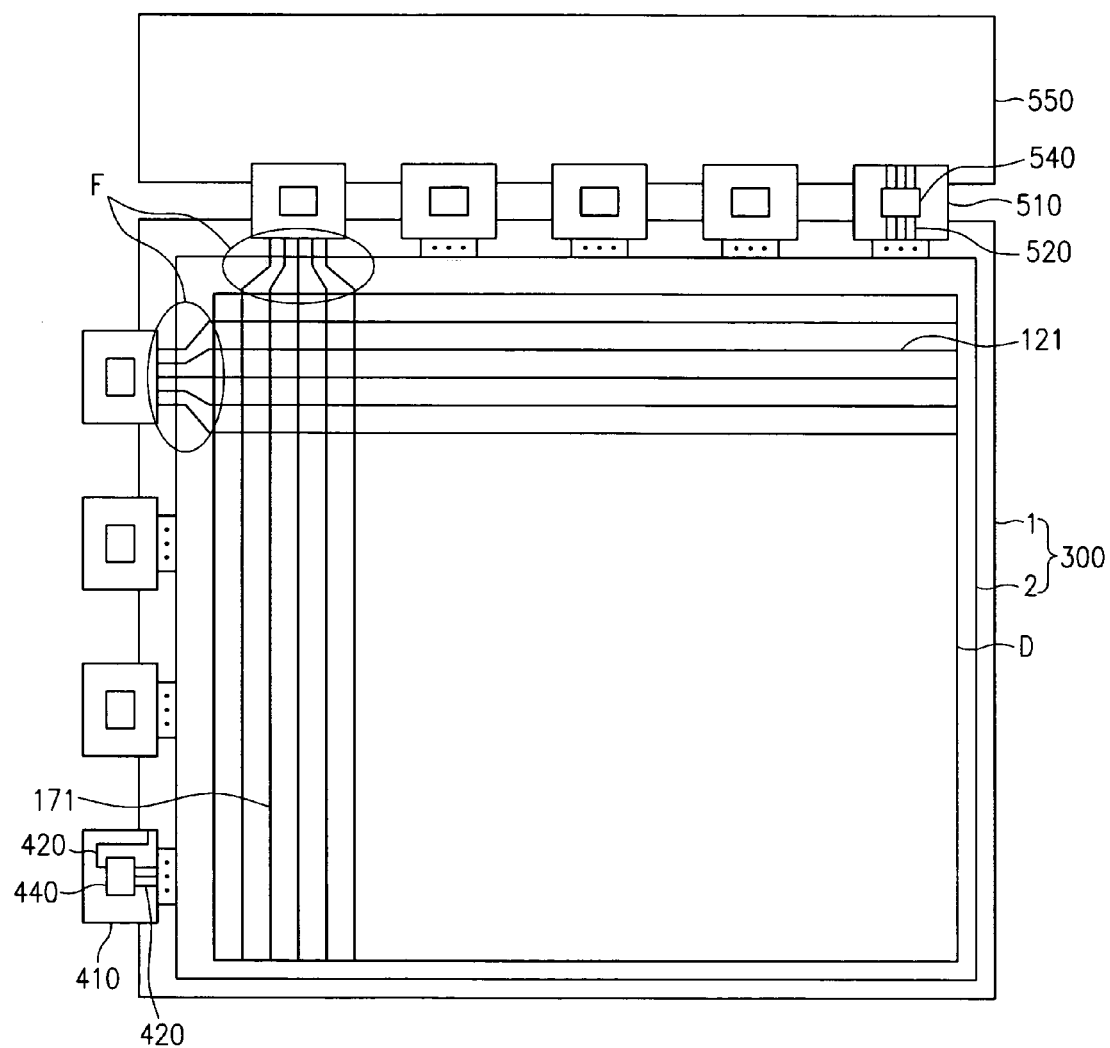
FIG. 1 is a schematic layout view of an LCD according to an embodiment of the present invention.

The present invention now will be described more fully hereinafter with reference to the accompanying drawings, in which preferred embodiments of the present invention are shown. The present invention may, however, be embodied in many different forms and should not be construed as limited to the embodiments set forth herein.

In the drawings, the thickness of layers and regions are exaggerated for clarity. Like numerals refer to like elements throughout. It will be understood that when an element such as a layer, region, panel or substrate is referred to as being "on" another element, it can be directly on the other element or intervening elements may also be present. In contrast, when an element is referred to as being "directly on" another element, there are no intervening elements present.

Now, display panels and liquid crystal displays (LCDs) according to embodiments of the present invention will be described in detail with reference to the drawings.

Figure 2:
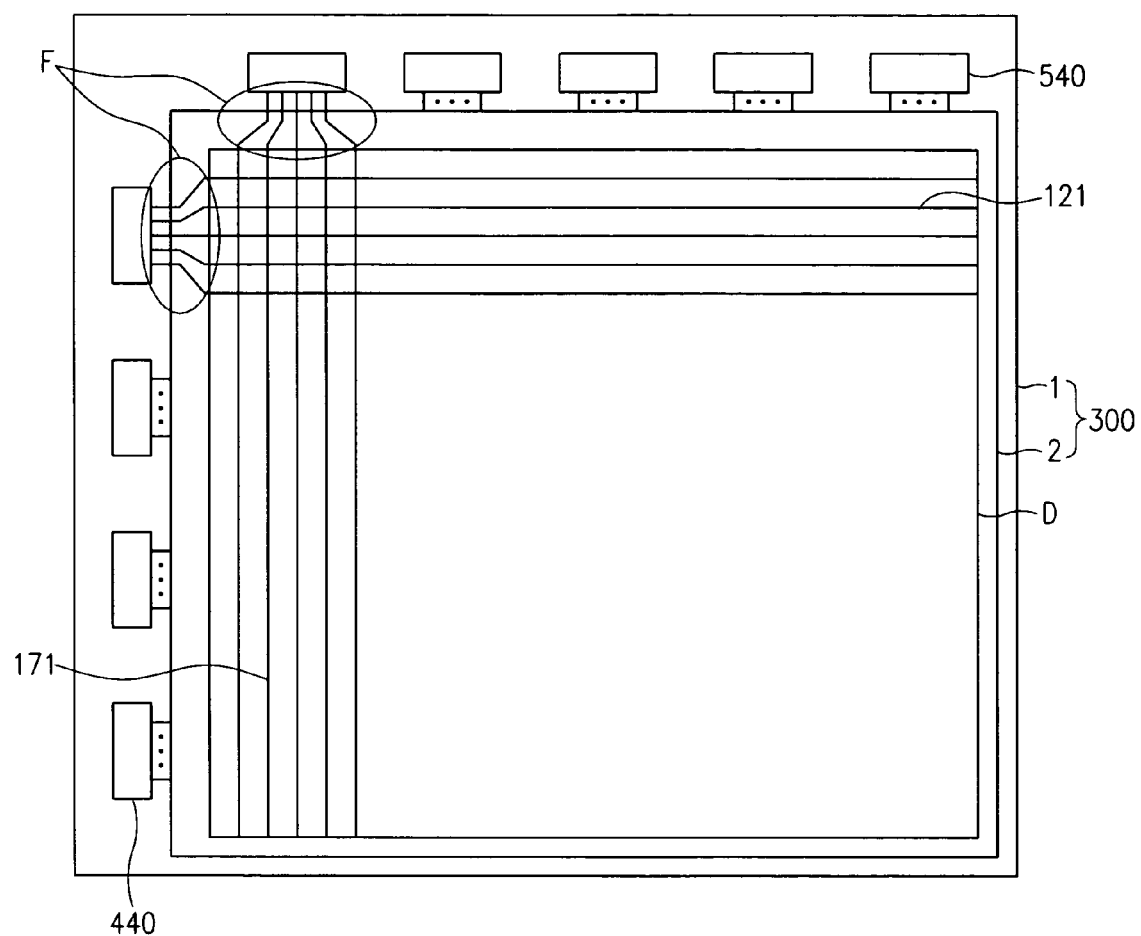
FIG. 2 is a schematic layout view of an LCD according to another embodiment of the present invention.
Figure 3:
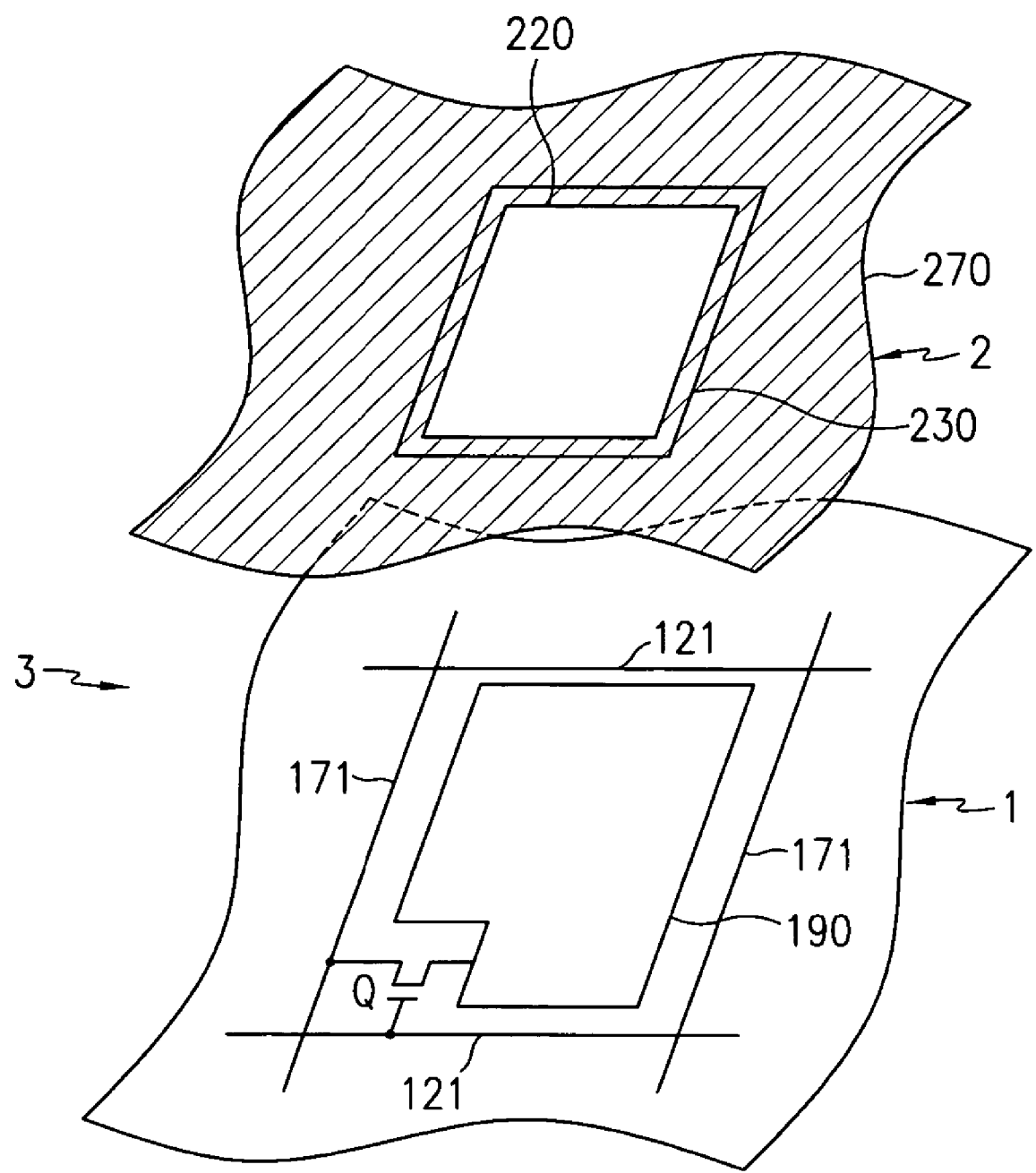
FIG. 3 is a schematic perspective view of an LCD according to another embodiment of the present invention.

FIG. 1 is a schematic layout view of an LCD according to an embodiment of the present invention, FIG. 2 is a schematic layout view of an LCD according to another embodiment of the present invention, and FIG. 3 is a schematic perspective view of an LCD according to another embodiment of the present invention.

Referring to FIG. 1, an LCD according to an embodiment of the present invention includes a liquid crystal panel assembly 300, a plurality of gate flexible printed circuit (FPC) films 410 and a plurality of data FPC films 510 attached to the panel assembly 300, and a printed circuit board (PCB) 550 attached to the data FPC film 510.

Referring to FIG. 3, the panel assembly 300 includes a lower panel 1 and an upper panel 2 facing each other and a liquid crystal layer 3 interposed between the two panels 1 and 2.

The upper panel 2 includes a black matrix 220 having a plurality of apertures arranged in a matrix, a plurality of primary color filters 230 such as red, green, and blue color filters disposed in respective apertures in the black matrix 220, and a common electrode 270 formed on an entire surface of the upper panel. These elements such as the black matrix 220, the color filters 230, and the common electrode 270 may be provided on the lower panel 1.

The lower panel 1 includes a plurality of pixel electrodes 190 arranged in a matrix, a plurality of switching elements Q connected to the pixel electrodes 190, a plurality of gate lines 121 connected to the switching elements Q and transmitting gate signals (also referred to as "scanning signals"), and a plurality of data lines 171 connected to the switching elements Q and transmitting data signals.

The pixel electrodes 190 face the apertures of the black matrix 220 and are preferably made of a transparent conductive material such as indium tin oxide (ITO) and indium zinc oxide (IZO) or of a reflective metal.

The switching elements Q includes three-terminal thin film transistors (TFTs), each switching element Q having control and input terminals respectively connected to the gate line 121 and the data line 171 and an output terminal connected to the pixel electrode 190 such that the switching element Q selectively transmits the data signals from the data lines 171 responsive to the gate signals from the gate lines 121.

Referring back to FIG. 1, a plurality of gate driver integrated circuits (ICs) 410 and a plurality of data driver ICs are chip-mounted on the gate FPC films 410 and the data FPC films 510, respectively. A plurality of leads 420 and 520 for electrical connection to an external device are formed on the FPC films 410 and 510, respectively.

Various circuit elements for driving and controlling the panel assembly 300 are provided on the PCB 550. The circuit elements are connected to the data driver ICs 540 via signal lines (not shown) provided on the PCB 550 and the leads 520 on the data FPC films 510. The electrical connection between the gate driver ICs 440 and the PCB 550 is made by signal lines (not shown) separately provided on the data PCB 550 and the lower panel 1 and the leads 420 on the gate FPC films 410.

Another embodiment shown in FIG. 2 mounts the driver ICs 440 and 550 directly on the lower panel 1 of the panel assembly 300, and the gate FPC film is not required. The PCB 550 and the data FPC film 510 are not shown in FIG. 2 for descriptive convenience.

According to another embodiment, an additional PCB (not shown) is attached to the gate FPC films 410, and some circuit elements of the PCB 550 are provided on the additional PCB.

According to an embodiment of the present invention, the driver ICs 440 and/or 540 are integrated into the lower panel 1, instead of being chip-mounted.

Referring to FIGS. 1 and 2, the lower panel 1 is divided into a display area D including the array of the pixel electrodes 190, and a peripheral area located outside the display area D and including the connections between the display signal lines 121 and 171 and the FPC films 410 and 510 (as shown in FIG. 1) or the driving ICs 440 and 540 (as shown in FIG. 2).

The display signal lines 121 or 171 are connected to the pixel electrodes 190 through the switching elements Q in the display area and extend substantially parallel to each other. The signal lines 121 and 171 have one ends connected to the FPC films 410 and 510 or the driver ICs 440 and 540. As shown in FIG. 1, the distance between the leads 420 of the FPC films 410 and 510 for the connection between the driver ICs 440 and 540 and the display signal lines 121 and 171 is smaller than the distance between the signal lines 121 or 171 in the display area D. Similarly, the distance between output terminals of the driver ICs 440 and 540 to be connected to the display signal lines 121 and 171 is smaller, as shown in FIG. 2, than the distance between the signal lines 121 or 171 in the display area D. Accordingly, there are a plurality of fan-out areas where the distance between the signal lines 121 or 171 varies such that the signal lines 121 or 171 are arranged like a fan.

Now, a fan-out area of a panel according to an embodiment of the present invention is described in detail with reference to FIGS. 4–6.

Figure 4:
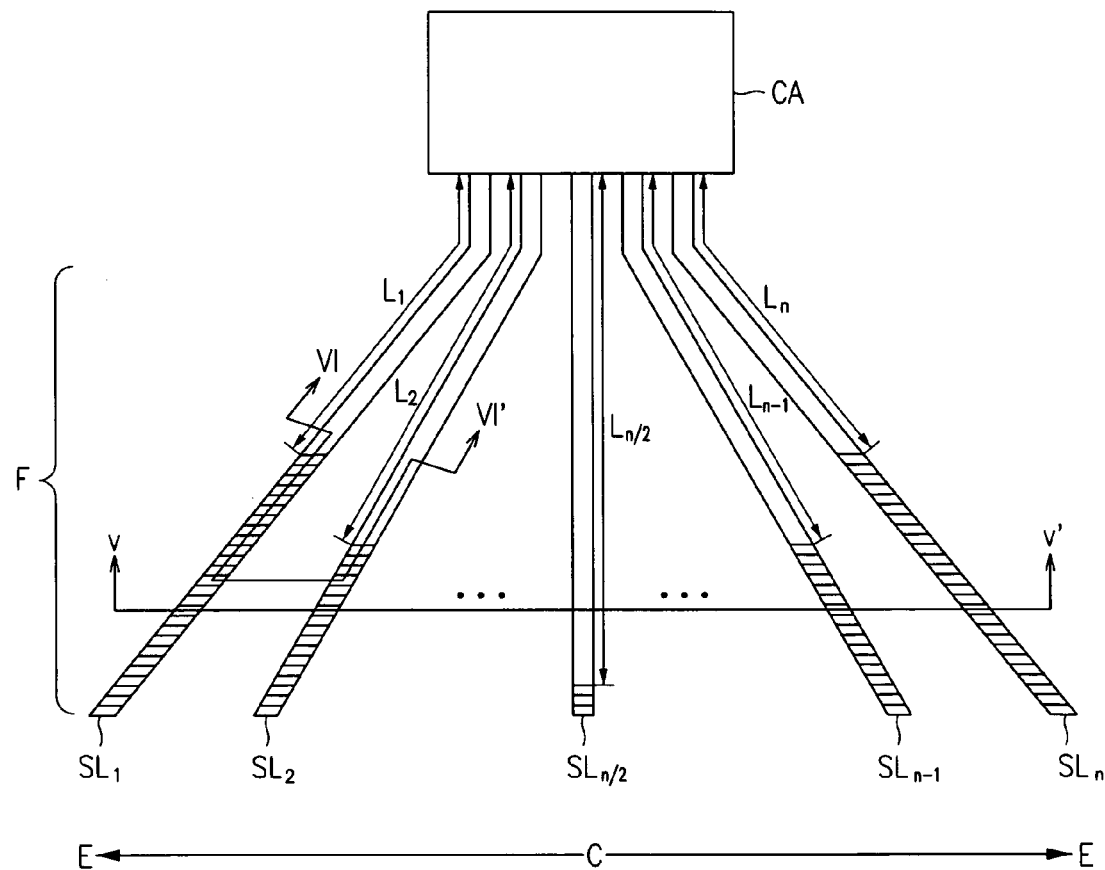
FIG. 4 is an enlarged layout view of a fan-out area shown in FIGS. 1 and 2.
Figure 5:
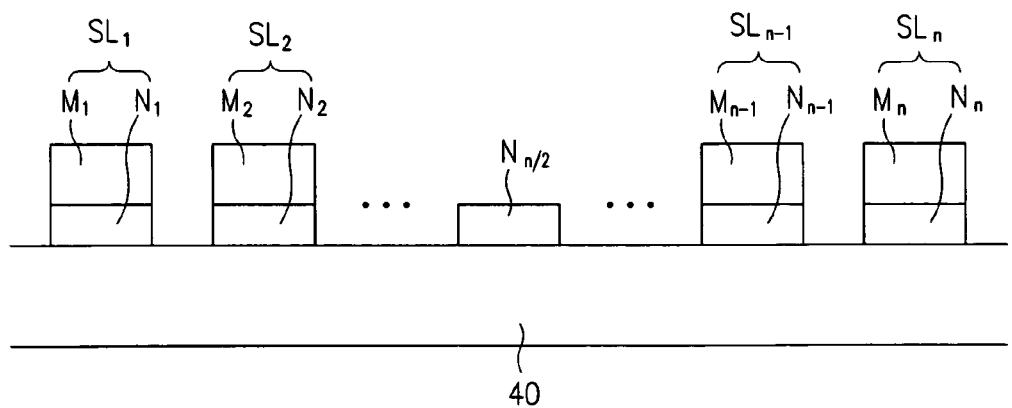
FIG. 5 is a sectional view of the fan-out area shown in FIG. 4 taken along the line V–V'.
Figure 6:
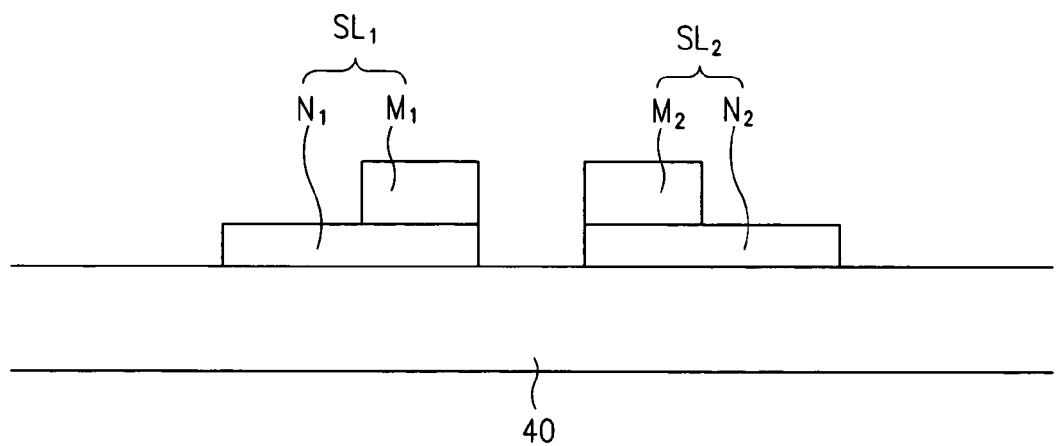
FIG. 6 is a sectional view of the fan-out area shown in FIG. 4 taken along the line VI–VI'.

FIG. 4 is an enlarged layout view of a fan-out area shown in FIGS. 1 and 2, FIG. 5 is a sectional view of the fan-out area shown in FIG. 4 taken along the line V–V', and FIG. 6 is a sectional view of the fan-out area shown in FIG. 4 taken along the line VI–VI'.

As shown in FIG. 4, signal lines $SL_1$–$SL_n$ such as gate lines 121 or data lines 171 are arranged like a fan in a fan-out area located between a display area D and a connection area CA. The connection area CA is an area where end portions of the signal lines $SL_1$–$SL_n$ are connected to FPC films 410 and 510 or driver ICs 440 and 540. The signal line such as $SL_{n/2}$ near a center C goes straight without curving. The signal lines, as they are closer to edges E of the fan-out area F, show larger curving angles, and the signal lines $SL_1$ and $SL_n$ closest to the edges E have the largest curving angles. Therefore, the length of portions of the signal lines $SL_1$–$SL_n$ in the fan-out area F and the length of the signal lines $SL_1$–$SL_n$ becomes longer as it goes to the edges F from the center C.

Each of the display signal lines $SL_1$–$SL_n$ includes at least one of a lower layer $N_1$–$N_n$ and an upper layer $M_1$–$M_n$, which are sequentially deposited on a substrate 40 and made of conductive material such as metal. The two layers $N_1$–$N_n$ and $M_1$–$M_n$ may have different resistivity. It is preferable that one of the two layers $N_1$–$N_n$ and $M_1$–$M_n$ are made of low resistivity metal such as Al, Al alloy, Ag and Ag alloy, and the other of the two layers $N_1$–$N_n$ and $M_1$–$M_n$ are made of Cr, Ti, Ta, Mo or their alloys such as MoW alloy having good physical, chemical and electrical contact characteristics with other materials such as indium tin oxide (ITO) and indium zinc oxide (IZO).

Referring to FIGS. 5 and 6, each signal line $SL_1$–$SL_n$ include a single-layered portion $L_1$–$L_n$ which extends to the connection area CA. The length of the single-layered portions $L_1$–$L_n$ of the signal lines $SL_1$–$SL_n$ becomes shorter as the length of the corresponding signal lines $SL_1$–$SL_n$ becomes longer. For example, the length of the single-layered portion $L_1$–$L_n$ is inverse proportional to the length of the corresponding signal line $SL_1$–$SL_n$.

As a result, the resistance of the signal lines $SL_1$–$SL_n$ in the fan-out area F is uniform. That is, the resistance difference of the length of portions in the fan-out area F or of the entire length of the signal lines $SL_1$–$SL_n$ is compensated by making the single-layered portions $L_1$–$L_n$ of longer signal lines $SL_1$–$SL_n$ shorter, while making those of shorter signal lines $SL_1$–$SL_n$ longer since the single-layered portion $L_1$–$L_n$ has larger resistance than other portions including two layers $N_1$–$N_n$ and $M_1$–$M_n$ electrically connected in parallel.

For example, it is assumed that the length of a portion of a signal line $SL_i$ in a fan-out area F and the length of the single-layered portion $L_i$ of the signal line $SL_i$ are indicated by $t_i$ and $s_i$, respectively, the resistivities of the lower layer $N_i$ and the upper layer $M_i$ are indicated by $\rho_N$ and $\rho_M$, respectively, and the areas of the sections of the lower layer $N_i$ and the upper layer $M_i$ are equal and indicated by A.

The resistance $R_i$(single) of the single-layered portion $L_i$ of the signal layer $SL_i$ is given by, $$R_i(\text{single}) = \rho_N \frac{s_i}{A}. \qquad (1)$$

The resistance $R_i$(double) of the remaining double-layered portion of the signal layer $SL_i$, which equals to the combined resistance of the resistance $R_i$(lower) of the lower layer $N_i$ and the resistance $R_i$(upper) of the upper layer $M_i$ connected in parallel, is given by, $$R_i(\text{double}) = \frac{1}{1/R_i(\text{lower}) + 1/R_i(\text{upper})} = \frac{\rho_N \rho_M}{\rho_N + \rho_M} \frac{t_i - s_i}{A}. \qquad (2)$$

Accordingly, the total resistance $R_i$ of the portion of the signal line $SL_i$ in the fan-out area F is obtained such that:

$$R_i = R_i(\text{single}) + R_i(\text{double}) = \rho_N \frac{s_i}{A} + \frac{\rho_N \rho_M}{\rho_N + \rho_M} \frac{t_i - s_i}{A}. \qquad (3)$$

Since the resistances of the portions of the signal lines $SL_1$–$SL_n$ in the fan-out area F are preferably equal to each other, the lengths $s_1$–$s_n$ of the single-layered portion $L_1$–$L_n$ of the signal lines $SL_1$–$SL_n$ are adjusted such that the resistances $R_1$–$R_n$ of all the signal lines given by Equation 3 are the same.

Figure 7:
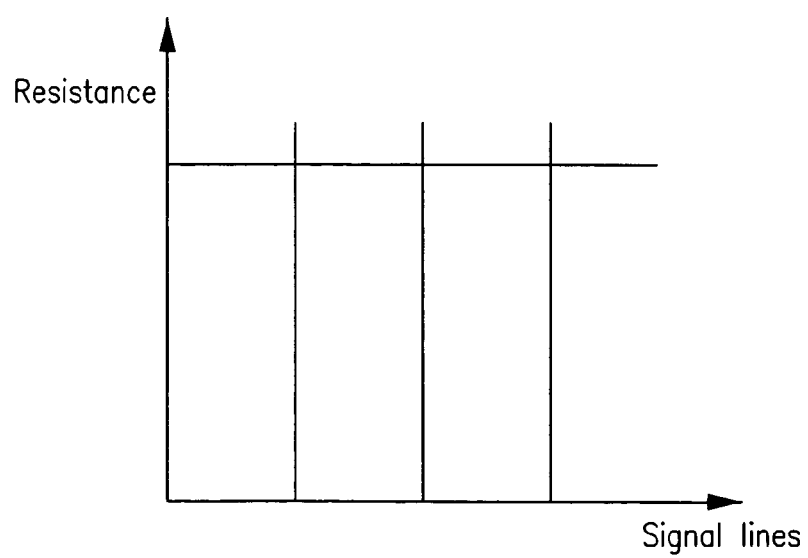
FIG. 7 is a graph showing resistances of signal lines in a fan-out area of a panel according to an embodiment of the present invention.

FIG. 7 is a graph showing resistances of signal lines in a fan-out area of a display panel having a signal line configuration. The line shown in FIG. 2 illustrates that the resistances of all the signal lines are the same. The term "substantially the same" means "the same" if the resistance deviation due to device error of a manufacturing device for manufacturing the signal lines $SL_1$–$SL_n$ and or operation error of the manufacturing device is ignored.

As described above, the embodiments of the present invention provide dual-layered signal lines for reducing the resistance difference due to the length difference in a fan-out area, thereby effectively removing image deterioration due to the resistance difference.

Although the embodiments focus on LCDs, the present invention is also applicable to any display devices having fan-out areas.

While the present invention has been described in detail with reference to the preferred embodiments, it is to be understood that the invention is not limited to the disclosed embodiments, but, on the contrary, is intended to cover various modifications and equivalent arrangements included within the sprit and scope of the appended claims.

What is claimed is:

1. A display panel including a plurality of signal lines, each signal line including a first portion and a second portion, the display panel comprising:
    a first area including the first portions of the signal lines; and
    a second area including the second portions of the signal lines,
    where the first portions of the signal lines have substantially the same length, the second portions of the signal lines have different lengths, the second portion of each signal line includes a third portion and a fourth portion including at least one layer, and the number of layers in the third portion is smaller than the number of layers in the fourth portion.

2. The display panel of claim 1, wherein the length of the third portion of each signal line depends on the entire length of the signal line.

3. The display panel of claim 2, wherein the length of the third portion of relatively longer signal line is relatively shorter.

4. The display panel of claim 3, wherein the length of the third portion of each signal line is inversely proportional to the entire length of the signal line.

5. The display panel of claim 4, wherein each signal line further comprises a fifth portion for connection with outside, and the display panel further comprises a third area including the fifth portions of the signal lines and located opposite the first area with respect to the second area.

6. The display panel of claim 5, wherein the signal lines are arranged like a fan in the second area.

7. The display panel of claim 6, wherein the length of the signal line closer to edges of the second area is longer.

8. The display panel of claim 5, further comprising a driving circuit connected to the signal lines in the third area and supplying signals to the signal lines.

9. The display panel of claim 8, wherein the driving circuit is chip-mounted on the display panel.

10. The display panel of claim 8, further comprising a printed circuit mounting the driving circuit and including a plurality of conductive lines for electrical connection between the driving circuit and an external device, the conductive lines connected to the signal lines in the third area.

11. The display panel of claim 2, wherein the third portion of each signal line has a single-layered structure and the fourth portion of each signal line has a double-layered structure.

* * * * *